Aug. 28, 1928.  G. J. VAROUTSOS  1,682,643
SIGNAL OPERATING MEANS
Filed Nov. 24, 1926   2 Sheets-Sheet 1
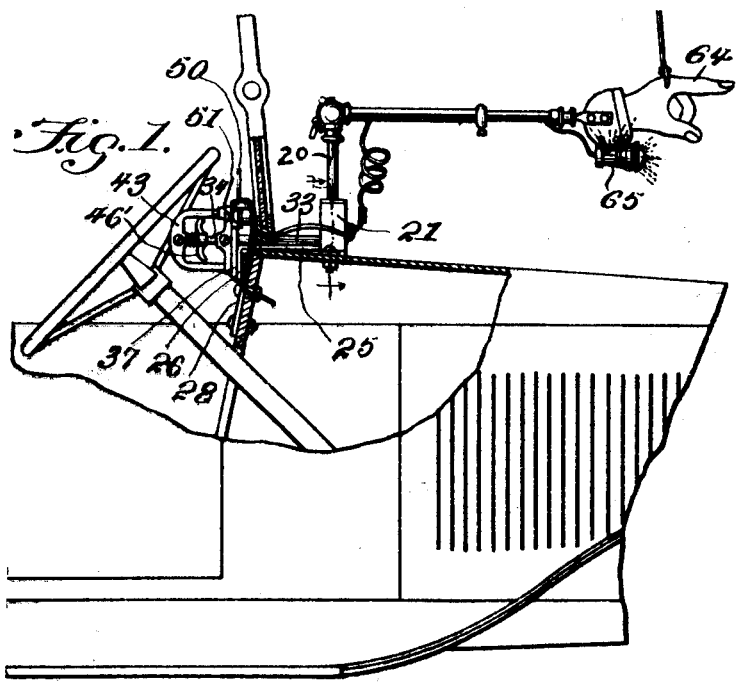
George J. Varoutsos
INVENTOR
BY Victor J. Evans
ATTORNEY
WITNESS:

Aug. 28, 1928.
G. J. VAROUTSOS
1,682,643
SIGNAL OPERATING MEANS
Filed Nov. 24, 1926
2 Sheets-Sheet 2
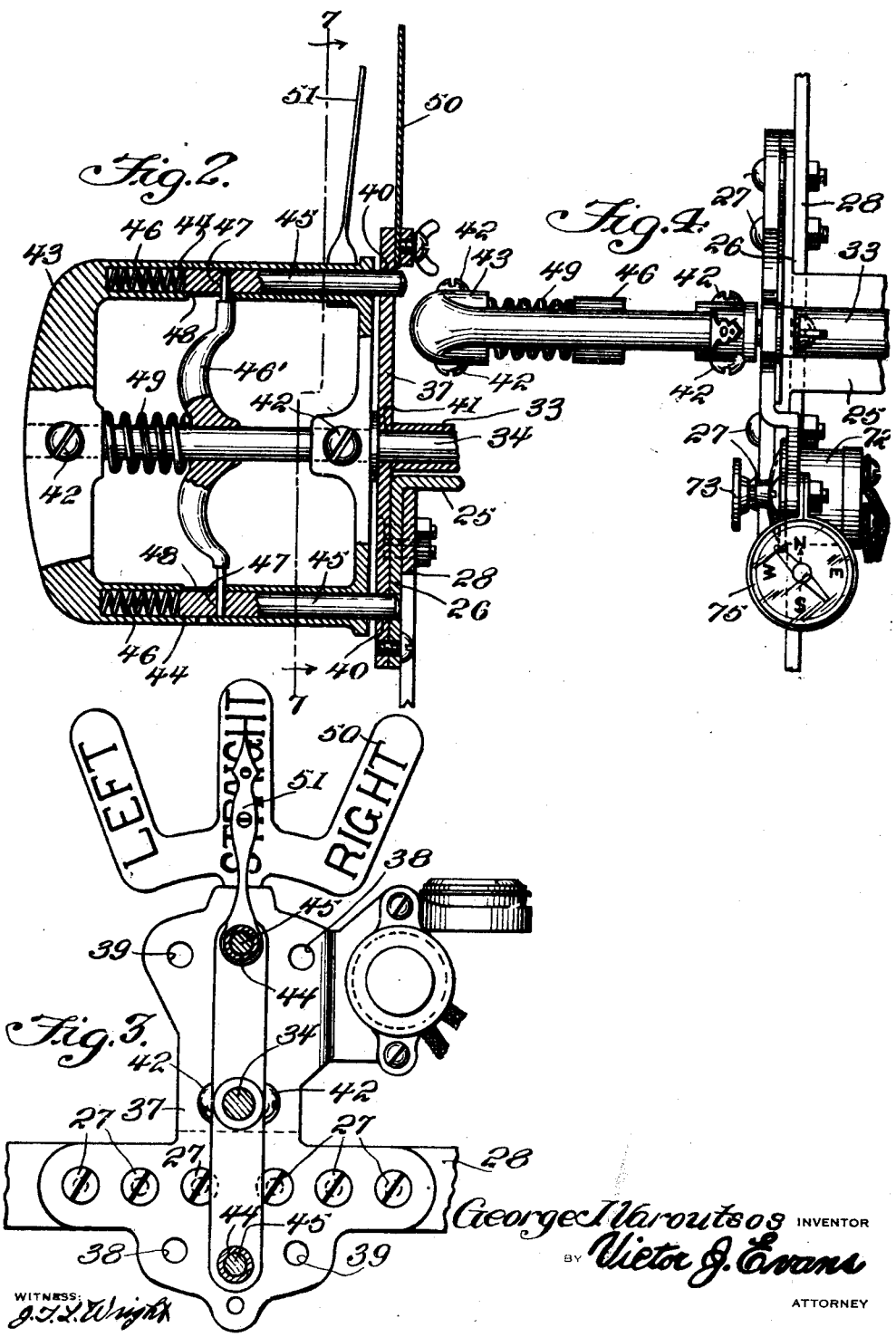
George J. Varoutsos INVENTOR
BY Victor J. Evans
ATTORNEY
WITNESS:

Patented Aug. 28, 1928.

1,682,643

UNITED STATES PATENT OFFICE.

GEORGE J. VAROUTSOS, OF LOWELL, MASSACHUSETTS.

SIGNAL-OPERATING MEANS.

Application filed November 24, 1926. Serial No. 150,506.

This invention relates to direction signals for vehicles and is an improvement upon the signal disclosed in Patent No. 1,579,977, granted to me April 8, 1926.

Like the patent just referred to, the present invention provides a signal which may be operated to indicate the direction of travel of a vehicle, either forward, or to the right or left, and is so constructed and arranged as to be in plain view of the drivers of other vehicles or pedestrians, either at the front, back or at the side of the vehicle so that the signal will be especially valuable to both drivers and pedestrians at street intersections.

The present invention aims to provide novel means for mounting and operating the signal, the construction being such that the parts may be readily assembled, and when so assembled will provide a signal operating means by means of which the signal may be rapidly and accurately moved to the desired position.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation partly in section showing the signal operating means in position for use.

Figure 2 is an enlarged fragmentary sectional view illustrating the operating handle and the means for locking the signal in adjusted position.

Figure 3 is a section on the line 7—7 of Figure 2.

Figure 4 is a top plan view of that portion of the invention illustrated in Figure 3.

Referring to the drawings in detail wherein like characters of reference denote corresponding parts, the invention is shown in connection with a signal device 20, having an indicator 64, and a lamp 65 at its outer end. The signal device is mounted upon an automobile by means of a housing 21 and has suitable operative connection with a shaft 34 arranged within the sleeve 33. The housing 21 is carried by a bracket 25, and this bracket includes a plate 26.

Secured to the plate 26 is a plate 37 which is provided with spaced openings 38, 39 and 40, and with an opening 41 for the passage of the shaft 35. Secured upon the extended end of the shaft 35 by means of set screws 42, is a substantially stirrup-shaped handle or grip 43. This handle is provided with parallel bores 44 which slidingly accommodate locking bolts 45, springs 46 located within these bars acting to force the bolts outward so that they may be positioned in the openings 38, 39 or 40.

Mounted for sliding movement upon the shaft 35 is a finger bar 46' whose opposite ends enter openings 47 which extend transversely of the bolts 45 and pass through elongated slots 48 in the handle or grip for this purpose. A spring 49 mounted upon the shaft 35 serves, in addition with the springs 46, to force the finger bar and bolts toward the plate 37. By means of the finger bar 46 the bolts may be retracted so that the shaft 35 may be rotated to adjustably position the same.

Extending from the plate 37 are radially disposed projections 50 having indicia thereon indicating "Straight", "Left" and "Right". The handle or grip 43 carries a pointer 51 which co-operates with this indicia to indicate the position of the signal, as will be hereinafter apparent.

The handle or grip 43 may be readily removed from the shaft 35 by loosening the screws 42. After the handle has been slipped from the shaft, one end of the finger bars 46 may be arranged to enter an opening 52 provided in the handle or grip 43, so that the said finger bar may be moved longitudinally to disengage the opposite end from the bolt. The finger bar will thus be removed and the bolts 43 released for removal. This permits of the substitution of loose springs or other elements when necessary.

The invention is susceptible of various changes in its form, proportions and minor details of construction and the right is herein reserved to make such changes as properly fall within the scope of the appended claims.

Having described the invention what is claimed is:—

1. Signal operating means comprising in combination with a rotatably mounted shaft, a rigidly mounted plate at the inner end of the shaft, a substantially stirrup-shaped handle secured to said shaft to rotate the latter, spring actuated locking bolts slidable in said handle to engage the rigid plate and hold said shaft against rotation, and means slidable upon the shaft and having its opposite ends engaged with the locking bolts to disengage said bolts from the plate.

2. Signal operating means comprising in combination with a rotatably mounted shaft, a rigidly mounted plate at the inner end of the shaft, a handle secured to the inner end of said shaft to rotate the latter, a spring actuated locking bolt carried by the handle to engage the rigid plate and hold said shaft against rotation, slidable means slidable upon the shaft and engaged with the locking bolt to disengage said bolt from the plate.

3. Signal operating means comprising in combination with a rotatably mounted shaft, a rigidly mounted plate through which the shaft extends, a substantially stirrup-shaped handle rigid with the shaft to rotate the latter, spring actuated means to lock the handle to the plate and hold the shaft against rotation, and means slidable longitudinally of the shaft within the handle and connected with the handle locking means to release the latter.

4. Signal operating means comprising in combination with a rotatably mounted shaft, a rigidly mounted plate through which the shaft extends, a substantially stirrup-shaped handle rigid with the shaft to rotate the latter, spring actuated means to lock the handle to the plate and hold the shaft against rotation, and a finger bar slidingly mounted transversely upon the shaft within the handle and having its opposite ends engaged with the handle locking means to release the latter.

In testimony whereof I affix my signature.

GEORGE J. VAROUTSOS.